2 Sheets--Sheet 1.

J. HELM.
Cotton Worm Destroyers.

No. 139,062. Patented May 20, 1873.

Witnesses:
E. Wolff
C. Sedgwick

Inventor:
J. Helm
per
Attorneys.

2 Sheets--Sheet 2.

J. HELM.
Cotton Worm Destroyers.

No. 139,062. Patented May 20, 1873.

Witnesses:
E. Wolff

Inventor:
J. Helm
PER
Attorneys.

UNITED STATES PATENT OFFICE.

JACK. HELM, OF HOCHHEIM, TEXAS, ASSIGNOR TO HIMSELF AND CHARLES TIM, OF SAME PLACE.

IMPROVEMENT IN COTTON-WORM DESTROYERS.

Specification forming part of Letters Patent No. 139,062, dated May 20, 1873; application filed November 16, 1872.

*To all whom it may concern:*

Figure 1:
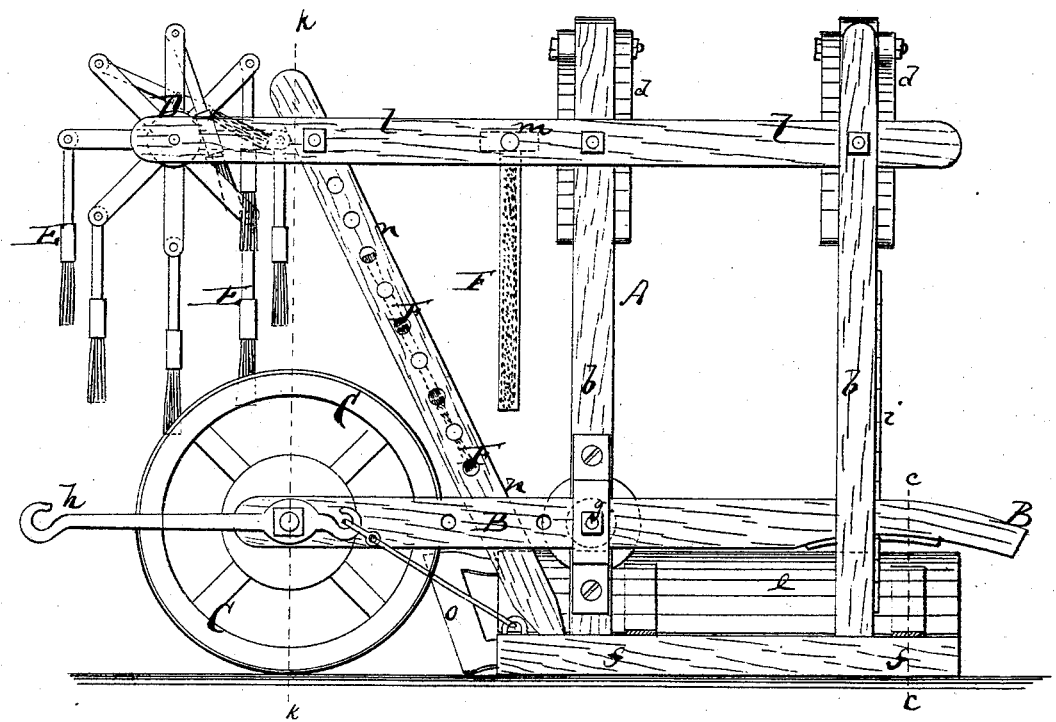
Figure 2:
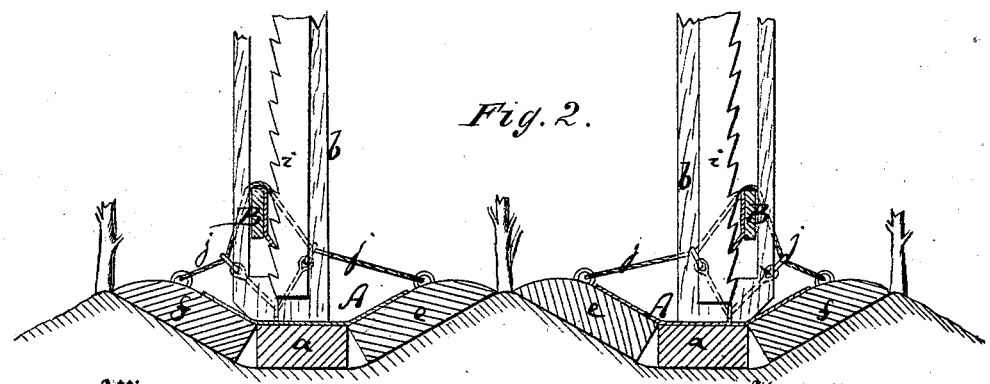
Figure 3:
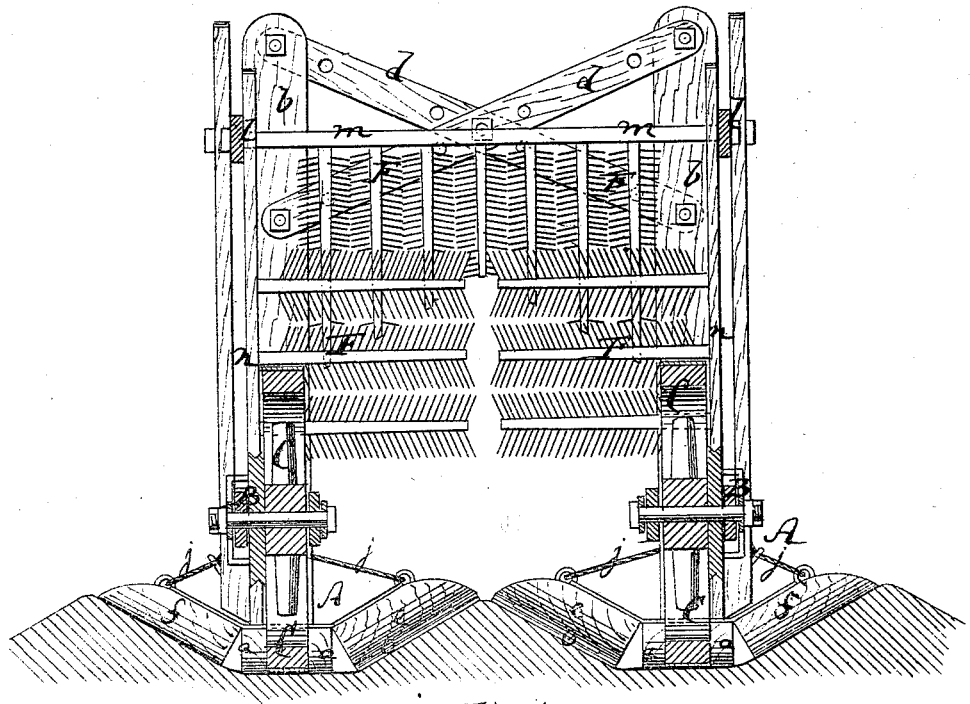
Figure 4:
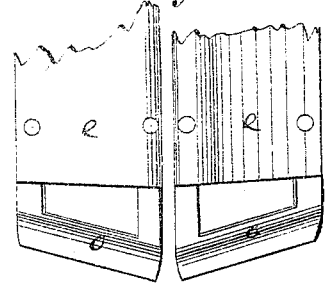

Be it known that I, JACK. HELM, of Hochheim, in the county of De Witt and State of Texas, have invented a new and Improved Cotton-Worm Destroyer, of which the following is a specification:

Figure 1 is a side elevation of my improved cotton-worm destroyer. Fig. 2 is a vertical transverse section of the lower part of the same taken on the plane of the line $c\,c$, Fig. 1. Fig. 3 is a vertical tranverse section on the line $k\,k$, Fig. 1; and Fig. 4, a top view of the ground-coverer or slides.

Similar letters of reference indicate corresponding parts.

This invention relates to a new machine for removing the destructive cotton-worms from the cotton-plants without injury to the plants, and for destroying the worms. My invention consists in the arrangement of a movable frame, which is by animals drawn over the fields to straddle the rows of cotton, and which is provided with brushes for sweeping the worms from the plants, and with jointed bottom pieces or slides, which crush them on the ground.

In the accompanying drawing, the letter A represents a frame composed of two bottom-boards, $a\,a$, of four or more uprights, $b\,b$, and a suitable series of cross-braces, $d\,d$. The boards $a\,a$ are on a level and parallel to each other, and have wings $e\,e$ and $f\,f$ hinged to their inner and outer edges, respectively. To each of the front posts $b$ is pivoted, at $g$, a lever, B, which carries a wheel, C, at its front end. There are thus two such wheels C C, that rest on the ground in front of the apparatus. Draft-hooks $h\,h$ are applied to the front ends of the levers B for hitching the draft animals to, by which the machine is drawn over the field. The levers B can be swung on their pivots, to raise the frame A on the wheels C, whenever stones, stumps, or other obstructions are to be avoided. In such case the levers B are or can be locked to toothed-plates $i$, which are applied to the rear posts $b$, as indicated in Fig. 2. When the machine is to be turned, it is also necessary to elevate the frame A off the ground, and throw the whole weight of the apparatus upon the wheels C. Whenever the frame A is thus raised, the wings $e$ and $f$ will be swung up, to clear the upper expanded parts of the cotton-plants. This is done by connecting the two wings that are hinged to each board $a$ with each other by a string, $j$, which passes over the lever B, so that in swinging up such lever, the string will be drawn with it to contract or swing up the wing. In the front ends of two horizontal bars $l\,l$, that are longitudinally secured to the upper parts of the posts $b$, is hung a transverse drum or shaft D, from which a series of pointed brushes, E E, are suspended. Brushes F F, are also rigidly affixed to a cross-bar, $m$, back of the shaft D, and to inclined bars $n\,n$, that are secured to the sides of the frame A. These several brushes are made of split white oak, or other suitable material.

For use, the machine is placed to straddle a row of cotton between the inner wings $e\,e$. The boards $a\,a$ rest in the furrows and the outer wings on the rising sides of the adjoining ridges, all as clearly shown in Fig. 2. The wings rest with their weight on the sides of the ridges. The machine being drawn ahead, the shaft D is revolved by its brushes E, which come in contact with the cotton-plants. Also, by subsequent contact with the brushes F F, the worms are all swept to the ground, on which they are finally crushed and destroyed by the weight of the boards $a$, and wings $e\,f$.

It will be noticed that as the machine is drawn successively over the several rows or ridges of cotton, each side of each ridge is twice pressed, once by an outer wing, $f$, and then by an inner wing, $e$, once while the apparatus straddles an adjoining ridge, and then again while it straddles the same ridge to which such side pertains.

Having thus described my invention, I claim as new and desire to secure by Letters Patent—

1. The frame A, lever B, wheels C, boards $a\,a$, and wings $e\,f$, combined with each other, and arranged to operate substantially as set forth and specified.

2. The jointed bottom $a\,e\,f$, and brushes E relatively arranged on a frame of the machine, as and for the purpose described.

3. The brushes F F, arranged, in combination with the rotary brushes E, on the frame of a cotton-worm destroyer, as set forth.

JACK. HELM.

Witnesses:
J. F. CUNNINGHAM,
J. SCHEVAB.